United States Patent [19]

Snowdon

[11] 4,355,929

[45] Oct. 26, 1982

[54] FLOW CONTROL DEVICE

[76] Inventor: Brian Snowdon, 14, Airedale Ave., Tickhill, Doncaster, South Yorkshire, England

[21] Appl. No.: 129,136

[22] Filed: Mar. 10, 1980

[30] Foreign Application Priority Data

Feb. 9, 1980 [GB] United Kingdom ............... 8004413

[51] Int. Cl.³ ............................................. B65G 53/40
[52] U.S. Cl. .................................. 406/125; 406/130; 406/146
[58] Field of Search ............... 406/123, 124, 125, 126, 406/127, 130, 146, 175; 222/189, 630

[56] References Cited

U.S. PATENT DOCUMENTS 4,118,075 10/1978 Lubbehusen .................... 406/125 X Primary Examiner—Jeffrey V. Nase
Attorney, Agent, or Firm—Reising, Ethington, Barnard, Perry & Brooks

[57] ABSTRACT

Apparatus for conveying bulk material at a controlled rate includes a pressure vessel from which material may be fed downwardly into a container under the influence of pressure applied to the pressure vessel. Located below the container is a receptacle or delivery tube into which bulk material may be fed. The container has a transverse partition with at least one orifice member therein and means are provided for balancing the pressure at a position below the partition with a position above the material located on the partition.

11 Claims, 5 Drawing Figures

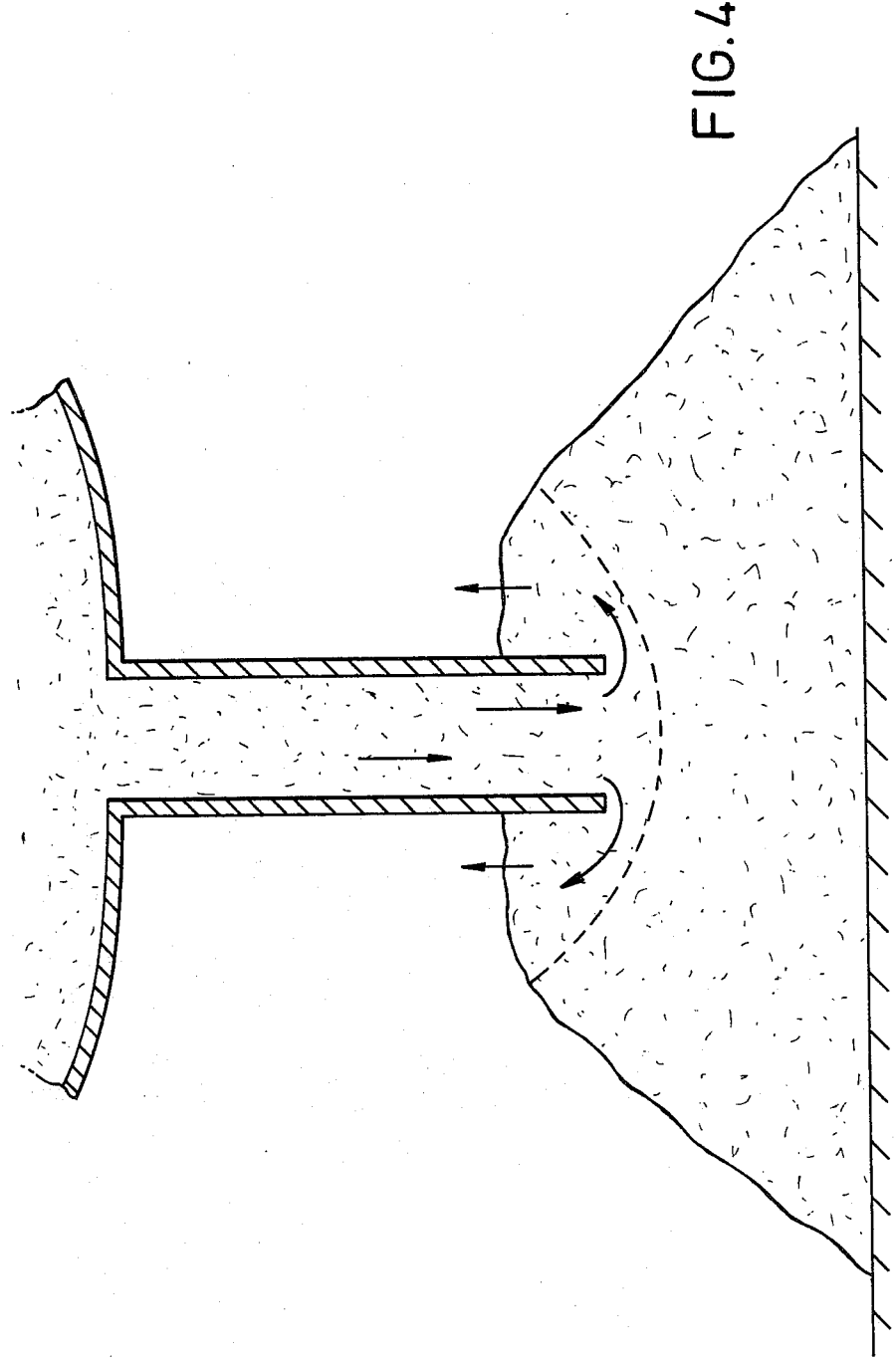

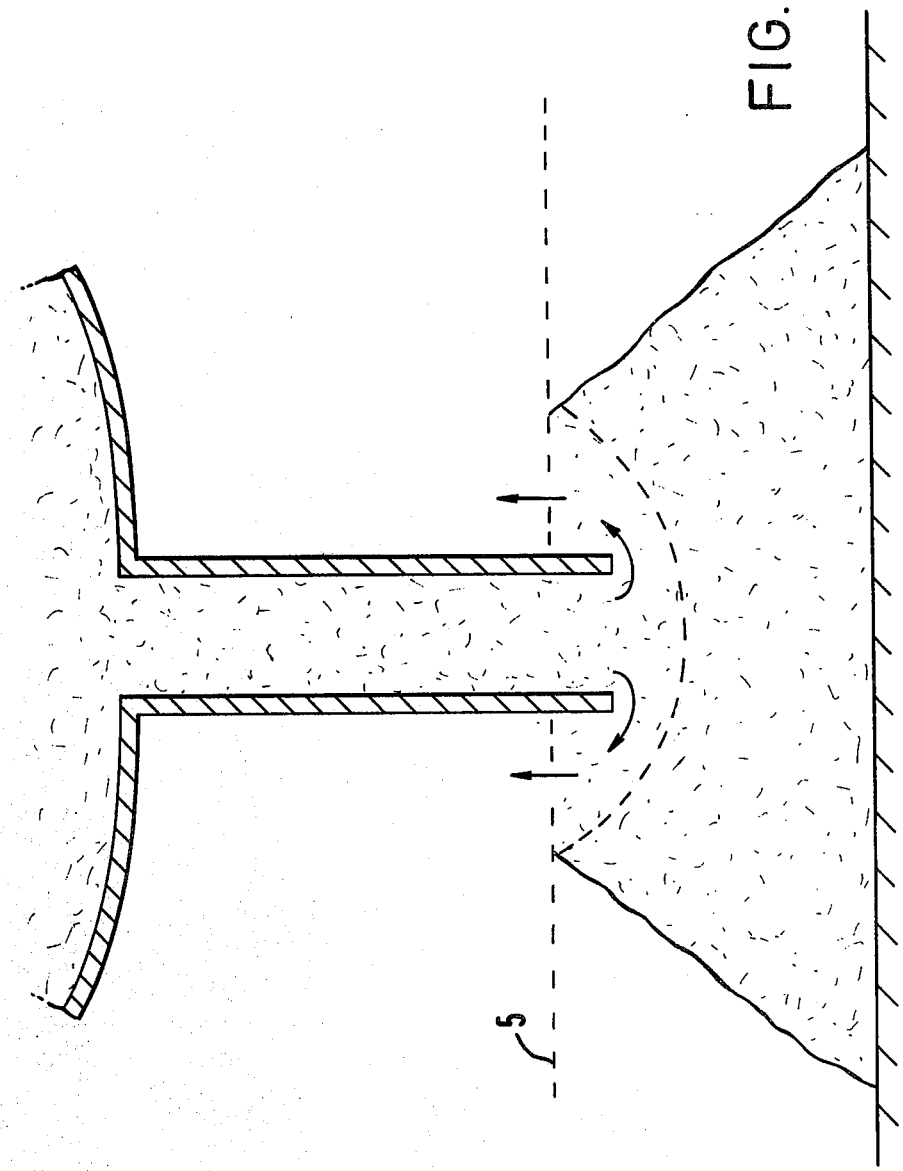

FLOW CONTROL DEVICE

This invention relates to methods and apparatus for controlling the flow of bulk material from a source of said material to the point where the material is to be used. The bulk material may be, for instance, in powder, granular or lumpy form and may be dry or wet.

In order to deliver such material at a controlled rate, mechanical equipment has previously been employed. Such equipment may include screw or belt conveyors. Pneumatic conveying apparatus has also been previously used but this has involved the use of complicated and expensive apparatus for fluidisation of the material, some degree of control of the rate of the conveying of the material being achieved by varying the pressure within the material container and the pressure of the fluidising air.

According to the present invention there is provided a method for conveying bulk material at a controlled rate by applying pressure within a vessel containing said bulk material so as to drive material into a receptacle or delivery pipe, the material passing downwardly into the delivery pipe via a container and through an orifice in a partition extending transversely of said container, a continuous head of material being maintained from the pressure vessel to the partition and the pressure at a position below the partition being balanced with the pressure at a position above the material located on said partition.

The present invention also provides apparatus for conveying bulk material at a controlled rate comprising means for applying pressure within a pressure vessel, a container located downwardly of the pressure vessel and being in fluid communication therewith, and a delivery pipe located downwardly of the container and being in fluid communication therewith, the container having a transverse partition with at least one orifice member therein, and pressure balance means for balancing the pressure at a position below the partition with a position selected to be above material located on the partition when the apparatus is in use.

The method and apparatus of the present invention allow the flow of material, particularly dry granular material, from a container at one pressure into another container or pipe at a different lower pressure. The rate of flow between the region of higher and lower pressure may be adjusted. Where the material is being allowed to flow to a pipe, the invention allows pressure to be applied to the pipe independently of the supply of material to the pipe, and the pressure supply to the original container, so as to move material along the pipe.

Furthermore the present invention enables a plurality of receiving containers or pipes to be supplied from the same original container and the rate of flow of material into each receiving pipe or container can be set independently. Furthermore this may be effected where each receiving container or pipe is at a different pressure, although lower than the pressure of the original container.

In preferred apparatus according to the present invention the container below the pressure vessel is divided, above the partition, into first and second regions by means of a material retaining member, said retaining member allowing gas flow but preventing bulk material flow between said first and second regions.

Preferably the material retaining member is a foraminous sheet.

Preferably the conduit extends from said pressure vessel into the container through said second region to a position within said first region. A portion of the conduit in the second region may be porous to allow gas to pass from the conduit into the second region.

Preferably the pressure balancing means comprises a tube extending within the container from the lower side of the partition to a position within the second region.

In order to ensure that the material in the conduit remains in a tightly packed condition, thereby preventing excessive gas flow, the cross-sectional area of the conduit is preferably greater than the area of the orifice or, in the case where there is more than one orifice, the sum of the areas of the orifices.

Preferably the apparatus is provided with means for adjusting the effective size of the or each orifice, in order to adjust the rate of flow of material through the orifice.

In a preferred embodiment of apparatus in accordance with the present invention, there are provided a plurality of the said containers, each being in fluid communication with the pressure vessel and each being in fluid communication with a respective receptacle or delivery pipe. This arrangement is particularly useful in the case where it is desired to deliver material at the same or different flow rates along pipe lines to different sites. Preferably each pipe line is provided with independent gas flow supply means so that material may be conveyed along said delivery tube at a desired rate.

An embodiment of the present invention will now be described, by way of example only, and with reference to the accompanying drawings, in which:

FIGS. 3 to 5 illustrate the flow of material in the apparatus of FIG. 1.

Figure 1:
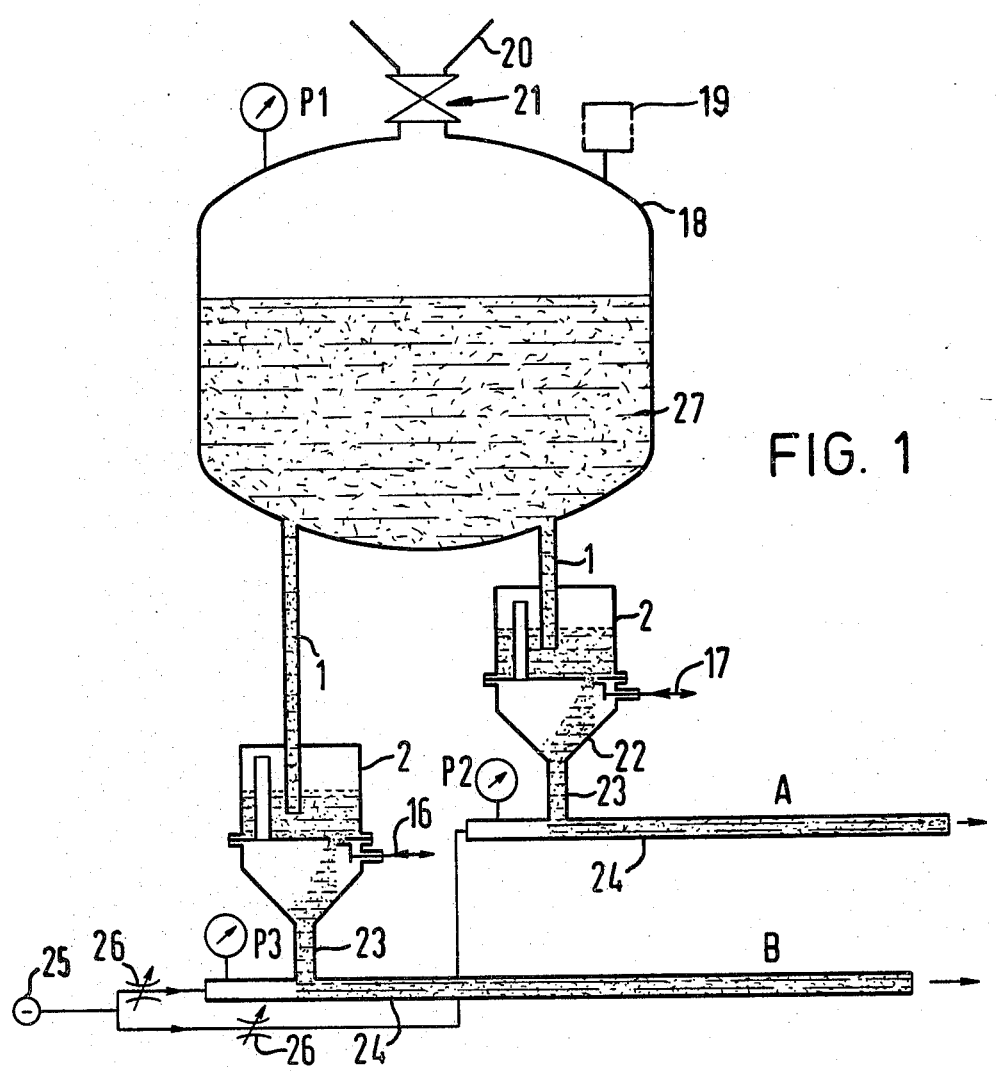
FIG. 1 is a diagrammatic representation of an embodiment of the present invention.

Apparatus in accordance with the present invention includes a pressure vessel 18 which may be fed from a hopper 20 through valve 21. Vessel 18 is pressurised to pressure P1 by a schematically illustrated means 19 for applying pressure within the pressure vessel.

Extending from the curved base of pressure vessel 18 are two feed conduits 1. Each conduit leads into a respective container or feed box 2. Extending from conical shaped base 22 of container 2 is a tube 23 which leads into pipe line 24. Each pipe line 24 is provided with a supply of pressurised air from a common source 25. However, the air to each pipe line 24 is independently controllable by means of gas flow controllers 26.

Dry granular material 27 which has been loaded into pressure vessel 18 may be supplied to each of pipe lines 24, which are maintained at lower pressures than the pressure in vessel 18. The material may be moved along pipe lines 24 by the pressurised air supply from source 25 to remote sites (not shown).

Figure 2:
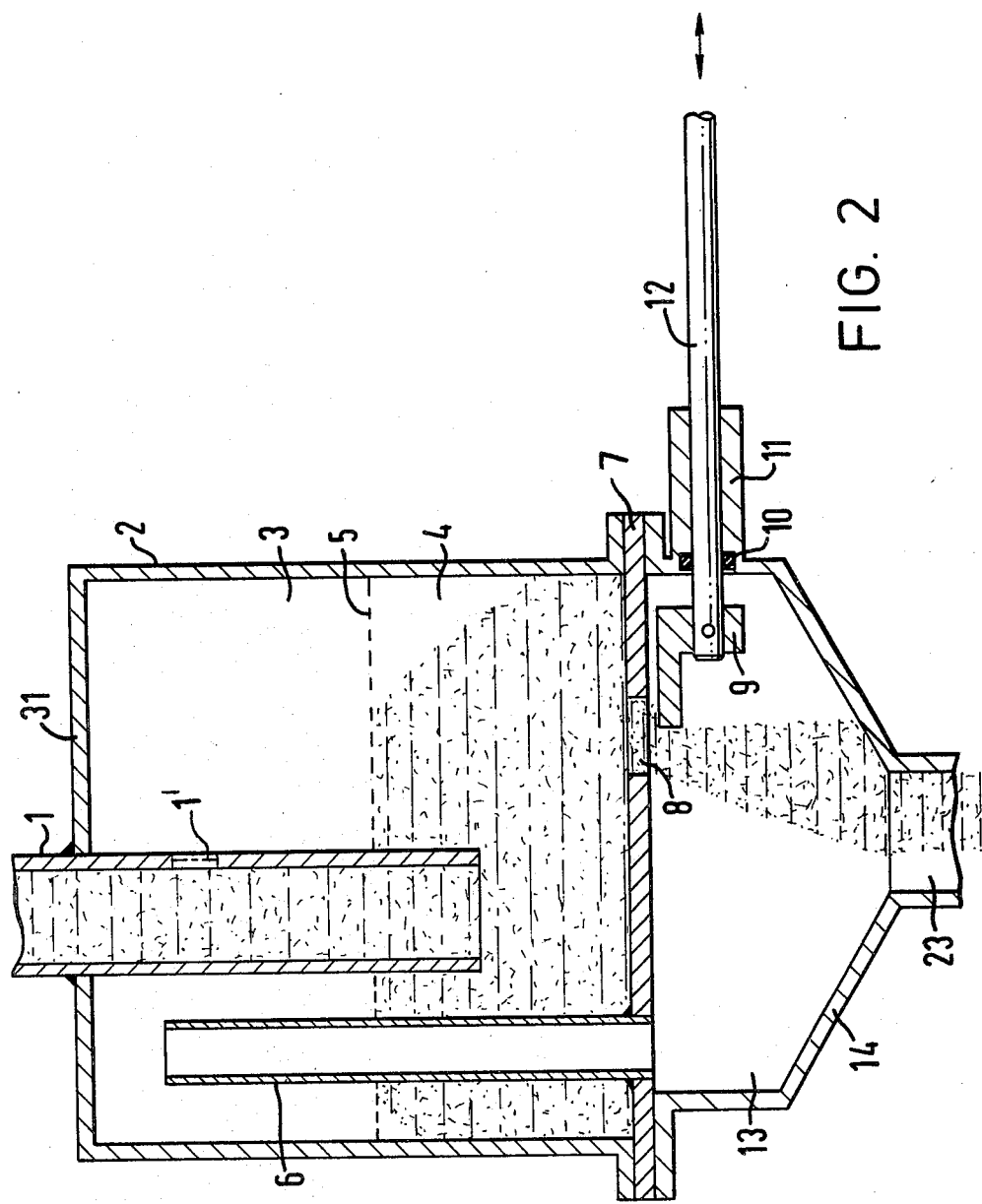
FIG. 2 shows detail of a portion of the apparatus shown in FIG. 1.

The controllable supply of material from vessel 18 to the pipe line and the independently controllable movement of material along the pipe line is made possible by the equipment located between the pressure vessel 18 and the pipe line. This equipment is best seen in FiG. 2. Container 2 is provided with a transverse partition or orifice plate 7. Orifice plate 7 is held in position between flanges of the upper part of container 2 and lower collection chamber 14. Orifice plate 7 is provided with orifice 8 which is situated a short distance from the centre of the orifice plate. The size of the orifice is adjustable by means of a gate 9, located below the orifice plate. Gate 9 is connected to a rod 12 which slides in bearing 11. Bearing 11 is provided with seals 10 which bear on rod 12 and ensure a gas tight seal. Movement of rod 12 longitudinally enables adjustment of the orifice size.

The upper part of container 2 is separated into a first lower region 4 and a second upper region 3 by means of a material retaining member embodied by mesh 5 or foraminous sheets. Mesh 5 has an aperture size smaller than the grain size of material being handled.

A tube 6 extends from the lower surface of orifice plate 7 through lower region 4 of container 2 to a position in upper region 3 some distance short of the upper wall 31 of container 2.

Feed tube 1 extends from pressure vessel 18 into container 2. It extends completely through the upper region 3 of container 2, through mesh 5 and into a central portion of lower region 4. An extension of the longitudinal axis of conduit 1 is offset from orifice 8.

Figure 3:
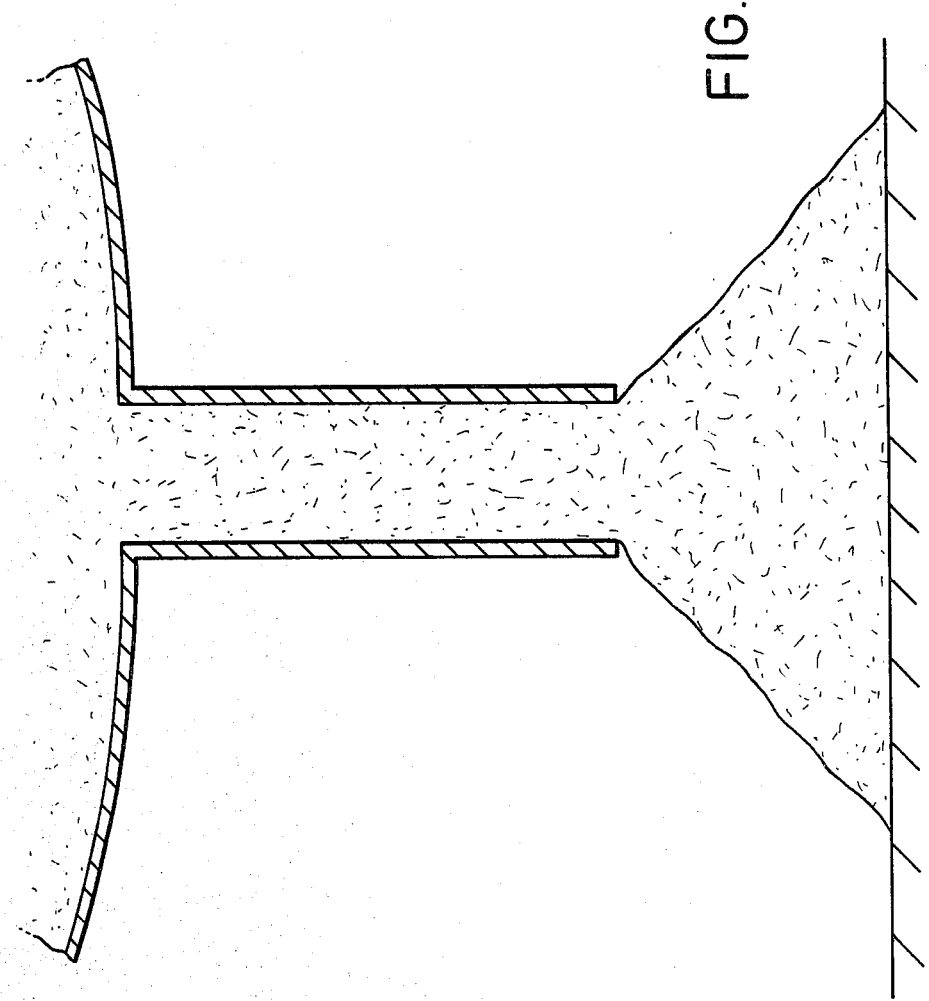

In use material in vessel 18 falls under gravity into pipe lines 24. The material passes into conduit 1 and enters lower region 4 of container 2. As best seen in FIG. 2 the material completely fills conduit 1 and a substantial portion of lower region 4. FIGS. 3 to 5 illustrate why this arises. As shown in FIG. 3, if the pressure in vessel 18 was lower than the pressure in container 2 then material would build up on the orifice plate 7 only to the bottom of tube 1. FIG. 4 illustrates the position where the pressure in vessel 18 is higher than that in container 2. Air permeates through the material in conduit 1 and slowly raises the level of material in container 2 because the material near the end of conduit 1 becomes partially fluidised. Accordingly the material level continues to rise. FIG. 5 illustrates the effect of mesh 5. The material rises until it contacts the under surface of mesh 5. The mesh aperture size is chosen so as to prevent movement of the material through the mesh but to allow the air to escape. The build up of material in the lower region 4 of container 2 continues to the position where substantially all, but not the whole of, region 4 is filled with material. If the aperture size of the mesh were too small, the air would not escape through the mesh, the lower region 4 of the container 2 would fill completely and there would be a rise in pressure in container 2.

Material from lower region 4 of container 2 falls under the influence of gravity through the orifice and into tube 23 leading to pipe line 24. The maximum size of orifice 8 is less than the cross-sectional area of conduit 1 to ensure that the material in conduit 1 remains in a tightly packed condition. If the material were not in such a condition in conduit 1 there would be excessive air flow into lower region 4 of container 2. If the container empties because material is flowing out faster than it flows in, the material flowing down conduit 1 will be so loose that excessive air flow down this conduit will result, thereby "blowing" material through the orifice rather than allowing it to pass through the orifice at a controlled rate.

Tube 6 acts to balance the pressure below orifice plate 7 with the position above the material in container 2. This ensures that the flow of granular material through orifice 8 is constant for a given setting of the orifice size.

Referring to FIg. 1, it can be seen from the above that the flow of material into pipe lines 24 can be accurately controlled and adjusted by means of rods 16 and 17. The pipe lines may be at different lower pressures P2 and P3 and the material flow is independent of fluctuation in pressures P1, P2 and P3 providing P1 is at least as high as P2 and P3.

As seen in FIG. 2, a schematically indicated portion 1' of the conduit 1 in the second region 3 of the container is porous to allow gas to pass from the conduit into the second region.

I claim:

1. A method for conveying bulk material at a controlled rate comprising feeding bulk material to a pressure vessel, applying pressure within the vessel so as to drive material into a material receiving means, the material passing downwardly into the material receiving means via a container and through an orifice in a partition extending transversely of said container, a continuous head of material being maintained from the pressure vessel to the partition, and the pressure at a position below the partition being balanced with the pressure at a position above the material located on said partition.

2. Apparatus for conveying bulk material at a controlled rate comprising means for feeding bulk material to a pressure vessel, means for applying pressure within the pressure vessel, a container located downwardly of the pressure vessel and having a transverse partition including at least one orifice, a conduit extending downwardly from said pressure vessel into the container and terminating above the transverse partition, material receiving means located below the container, and pressure balance means for balancing the pressure at a position below the partition with a position selected to be above material located on the partition when the apparatus is in use.

3. Apparatus according to claim 2 wherein the container includes a material retaining member that divides the container above the partition into a first lower region and a second upper region, said retaining member allowing gas flow but preventing bulk material flow between said first and second regions.

4. Apparatus according to claim 3 wherein the material retaining member is a foraminous sheet.

5. Apparatus according to claim 4 wherein the cross-sectional area of the conduit is greater than the orifice area.

6. Apparatus according to claim 3 wherein said conduit extends from said pressure vessel into the container and through said second region to a position within said first region.

7. Apparatus according to claim 6 wherein at least a portion of the conduit in the second region is porous to allow gas to pass from the conduit into the second region.

8. Apparatus according to claim 3 wherein the pressure balancing means comprises a tube extending within the container from the lower side of the partition to a position within the second region.

9. Apparatus according to claim 2 wherein the apparatus includes means for adjusting the effective orifice size.

10. Apparatus according to claim 2 including a plurality of said containers and a plurality of said conduits for respectively feeding material from said pressure vessel to said containers, and a separate material receiving means for receiving material from each container.

11. Apparatus according to claim 10 wherein each material receiving means includes an independent gas flow supply means so that material may be conveyed at a desired rate.

* * * * *